June 13, 1967  P. M. HAAS  3,325,727
CAPACITY MEASURING DEVICE INCLUDING AN INTEGRATING
ANALOG TO DIGITAL CONVERTER
Filed Nov. 5, 1964  2 Sheets-Sheet 1

INVENTOR
PAUL M. HAAS
BY
Richard K. Macneill

INVENTOR
PAUL M. HAAS
BY
Richard K. Macneill

United States Patent Office 3,325,727
Patented June 13, 1967

3,325,727
CAPACITY MEASURING DEVICE INCLUDING AN INTEGRATING ANALOG TO DIGITAL CONVERTER
Paul M. Haas, San Diego, Calif., assignor, by mesne assignments, to Honeywell Inc., Minneapolis, Minn., a corporation of Delaware
Filed Nov. 5, 1964, Ser. No. 409,078
8 Claims. (Cl. 324—60)

The present invention relates to a capacitance measuring device and more particularly to a capacitance measuring device for use with integrating digital volt meters.

This application is a continuation-in-part of my co-pending application, Ser. No. 384,762, filed July 23, 1964, for Analog to Digital Converter.

According to the invention, a pair of equal and opposite D.C. voltages are alternately applied through an unknown capacitor to the input of an integrating analog to digital converter such as that disclosed in the above-referenced co-pending application. The analog to digital converter recycling system is utilized to time the switching of the equal and opposite positive and negative voltages in that for each reading one voltage is applied to the unknown capacitance, resulting in a pulse input to the integrating analog to digital converter. This yields a measure of the volt second area of the pulse. The input pulse to the analog to digital converter will have a volt second area which is proportional to the amount of capacitance of the unknown element to be measured.

A further novel feature of the invention lies in applying the input pulse half-way through the reading cycle of the analog to digital converter which necessitates a reversal of polarity of the D.C. voltages at the input to the unknown capacitive element. This cancels any variation received at the input to the analog to digital converter, caused by resistance in the unknown reactance, resulting in a true capacity reading at the output.

An object of the present invention is the provision of a capacity measuring device which can be utilized in conjunction with any integrating analog to digital converter.

Another object is to provide a capacity measuring device in which resistance components can be cancelled in the output reading.

A further object of the invention is the provision of a capacity measuring device which is simple, inexpensive and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
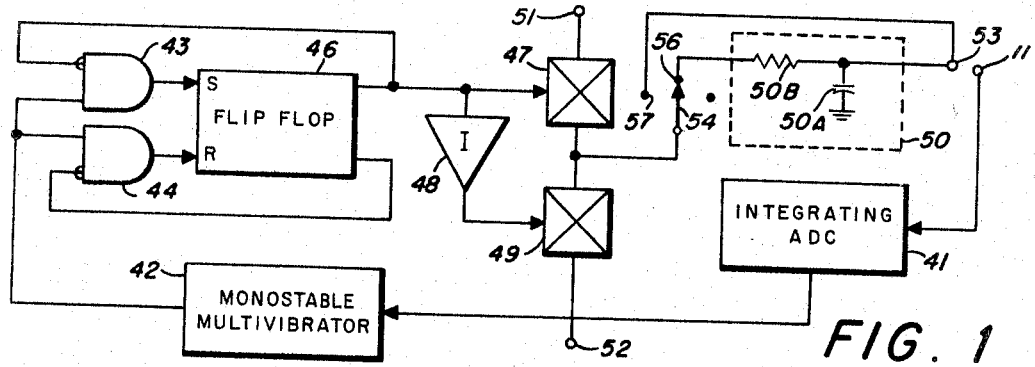
FIG. 1 is a block diagram showing the present invention in conjunction with existing integrating analog to digital converters.

Referring to FIG. 1, input terminal 11 is connected to integrating analog to digital converter 41. Integrating analog to digital converter 41 has a timing output connected to monostable multivibrator 42, the output of which is connected to the signal inputs of And gates 43 44. And gates 43 and 44 have outputs connected to the set and reset inputs, respectively, of flip-flop 46. Flip-flop 46 has one output connected to the enabling input of And gate 43 and another output connected to the enabling input of And gate 44. The output to the enabling And gate of 43 is also connected to a control input of controlled switch 47 and through inverter 48 to a control input of controlled switch 49. The input plus terminal 51 is connected to the input of controlled switch 47 and minus input terminal 52 is connected to the input of controlled switch 49. The outputs of controlled switches 47 and 49 are connected together and to switch arm 54. Switch arm 54 has contacts 56 and 57 connected to resistance 50B and terminal 53, respectively. Resistance 50B is connected to output terminals 53 and capacitance 50A. Resistance 53 and capacitance 50A comprise an integrator 50.

Figure 2:
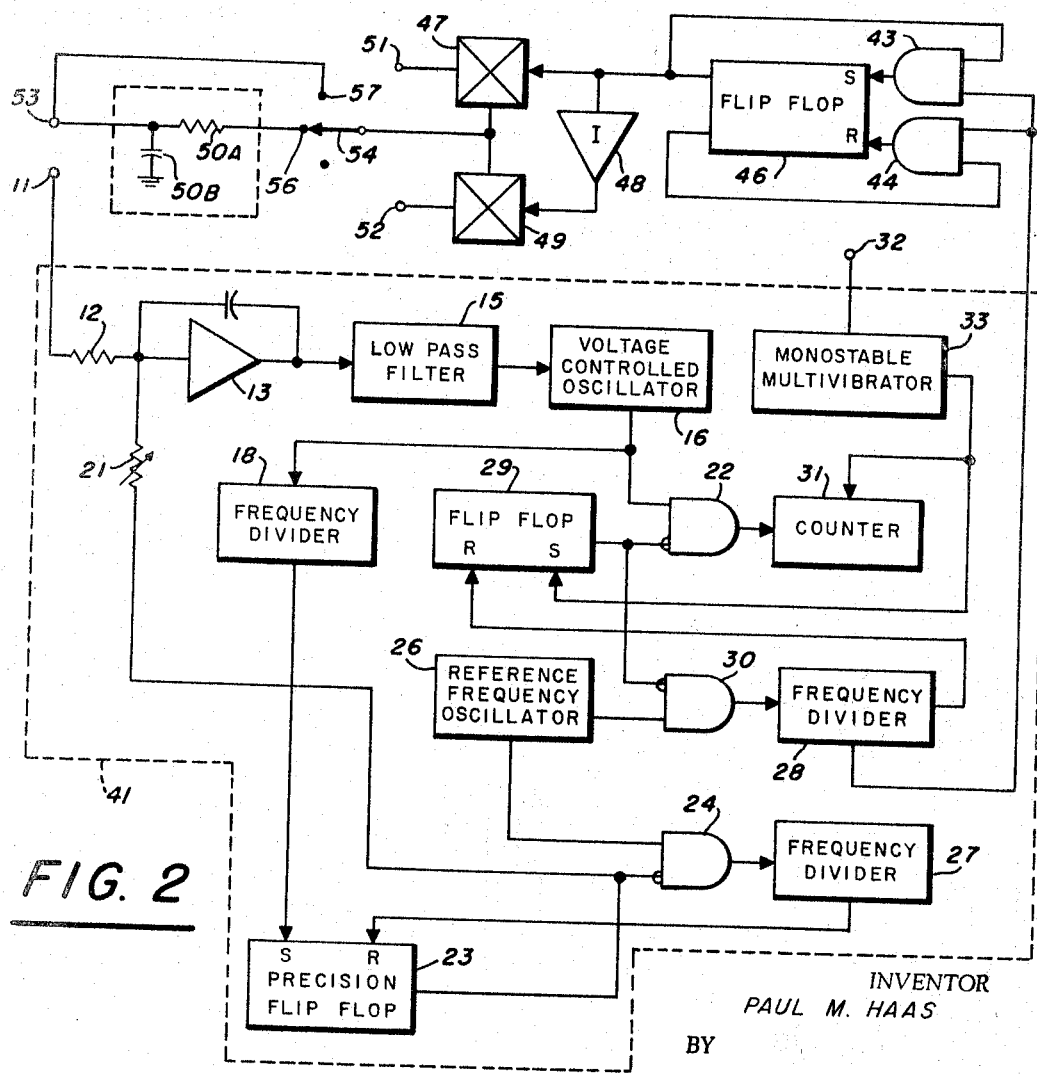
FIG. 2 shows the present invention as utilized in conjunction with a specific analog to digital converter.

Referring to FIG. 2, input terminal 11 is connected through resistance 12 to the input of integrator amplifier 13. The output of integrator amplifier 13 is connected through low pass filter 15 to voltage controlled oscillator 16. Integrating capacitor 14 is connected from the output of integrator amplifier 13 back to its input. The output of voltage controlled oscillator 16 is connected to frequency divider 18, the output of which is connected to the set input of precision flip-flop 23. The output of precision flip-flop 23 is connected to an enable input of And gate 24 and through variable resistance 21 to the input of integrator amplifier 13.

Terminal 32 is connected to the trigger input of monostable multivibrator 33, the output of which is connected to counter 31 and the set input of flip-flop 29. The output of flip-flop 29 is connected to the enable inputs of And gates 22 and 30. Reference frequency oscillator 26 is connected to the signal inputs of And gates 30 and 24. The output of And gate 24 is connected to frequency divider 27, the output of which is connected to the reset input of precision flip-flop 23. The output of And gate 30 is connected to frequency divider 28, the output of which is connected to the reset input of flip-flop 29.

Frequency divider 28 also has an intermediate output which is connected to the signal inputs of And gates 43 and 44. The outputs of And gates 43 and 44 are connected as set and reset inputs respectively to flip-flop 46. Flip-flop 46 has one output connected to the enable input of And gate 43 and to the control input of controlled switch 47 and through inverter 48 to the control input of controlled switch 49. Another output of flip-flop 46 is connected as an enable input to And gate 44. Plus terminal 51 is connected as an input to controlled switch 47 and minus terminal 52 is connected as an input to controlled switch 49. The outputs of controlled switches 47 and 49 are connected together and to switch arm 54. Switch arm 54 has contacts 56 and 57 connected to terminal 53 and resistance 50B, respectively. Resistance 50B is connected to terminal 53 and capacitance 50A. Resistance 50B and capacitance 50A form integrator 50.

Figure 3:
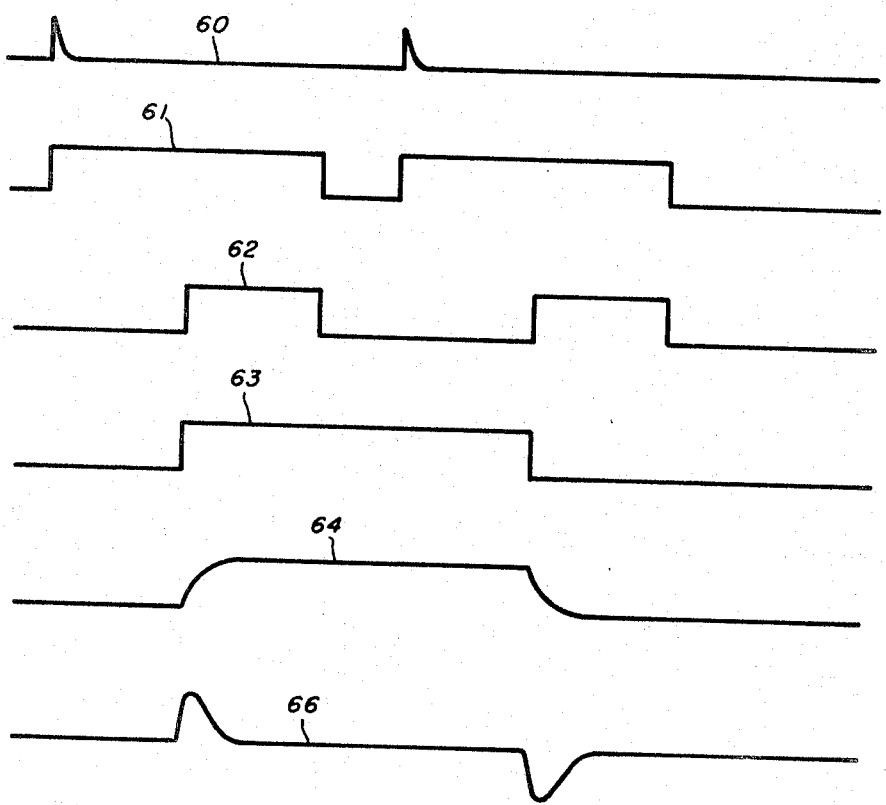
FIG. 3 illustrates a series of wave forms present throughout the systems of FIG. 1 and FIG. 2.

Referring to FIG. 3, wave form 61 shows the time base of integrating analog to digital converter 41 of both FIGS. 1 and 2. Wave form 62 shows the output of monostable multivibrator 42 of FIG. 1 and the intermediate output of frequency divider 28 of FIG. 2.

Wave form 63 shows the output of flip-flop 46 of both FIGS. 1 and 2. Wave form 64 shows the signal present at terminal 53 of FIGS. 1 and 2. Wave form 66 shows the input to analog to digital converter 41 at input terminals 11 of FIGS. 1 and 2 when a capacitor is applied across terminals 11 and 53.

OPERATION

Referring to FIGS. 1 and 3, it will be assumed that a time base wave form 61 is generated within integrating analog to digital converter 41 and is presented on its negative slope to the monostable multivibrator 42 during the stable portion of monostable multivibrator cycle. The output of monostable multivibrator 42 is shown as wave form 62. Halfway through the timing or counting cycle of analog to digital converter 41 monostable multivibrator 42 reverts back to its stable state shown as the positive portion of wave form 62. Wave form 62 is then applied as the signal input to AND gates 43 and 44. Depending on which state flip-flop 46 is in, And gate 43 or 44 will pass the output of monostable multivibrator 42, changing the state of flip-flop 46, the output of which is shown as wave form 63. Assuming a positive signal closes both switches 47 and 49 (only one of which can receive a positive signal at one time due to inverter 48) then switches 47 and 49 will be alternately turned on halfway through the counting cycle or period of integrating analog to digital converter 41. This will result in wave form 64 being applied to terminal 53 (in the position shown of switch arm 54).

If a capacitor is connected between terminals 53 and 11, the capacitor will differentiate wave form 63 and wave form 66 will appear at input terminal 11 to integrating analog to digital converter 41.

Referring to time base wave form 61 and input wave form 66, it will be seen that during one count period a positive voltage is applied and during the next count period an equal and opposite negative voltage is applied. Further assuming that integrating analog to digital converter 41 is capable of measuring both positive and negative voltages, the counter will register an equal amplitude but the sign will keep reversing. It is further pointed out that since analog to digital converter 41 is an integrating type of analog to digital converter the output reading will be directly proportional to the volt second area of the wave form at its input, i.e., wave form 66. Since the volt second area is also directly proportional to the size of the unknown capacitor between terminals 53 and terminal 11 the output reading can be calibrated directly in capacitance units.

The purpose of the reversal of polarity is to cancel out any DC or resistive component, i.e., leakage which may be present in a capacitor being measured.

In order to increase the range of the instrument, a series of integrators such as that shown at 50 can be switched in ahead of the unknown capacitance. This applies an exponential function to the unknown capacitance allowing the measurement of smaller capacitors by changing the scale or range of the meter.

Referring to FIG. 2, the instant invention is shown in conjunction with the analog to digital converter of the above referenced co-pending application.

Since the analog to digital converter portion FIG. 2 has been explained in the parent application, a detailed description is deemed unnecessary. However, in the interest of clarity, an input potential at input terminal 11 is integrated in integrator amplifier 13, the output of which is passed through low pass filter 15 to control the frequency of voltage controlled oscillator 16. This frequency is divided down in frequency divider 18 to set precision flip-flop 23, the output of which is coupled back as a feedback voltage to the input of integrator amplifier 13. Reference frequency oscillator 26 is then passed through And gate 24, the output of which is divided in frequency divider 27 to reset precision flip-flop 23. A cycling or time base start signal shown as waveform 60 in FIG. 3 is applied at terminal 32 which triggers monostable multivibrator 33 which sets flip-flop 29, yielding a time base waveform 61 which starts counter 31 counting the output of And gate 22. Monostable multivibrator 33 also sets flip-flop 29 which enables And gate 30 and allows frequency divider 28 to count down the output of reference frequency oscillator 26. At some later time, an output from frequency divider 28 resets flip-flop 29 which stops And gate 22 from passing the output of voltage controlled oscillator 16 and the count cycle is completed.

A median output from frequency divider 28 can be taken, as shown, to yield a pulse half-way between the start pulse 60 at input terminal 32 and the resetting of flip-flop 29, to trigger flip-flop 46 in the same manner as monostable multivibrator 42 triggered flip-flop 46 in FIG. 1. This is shown as an alternative and more accurate means of controlling the half-way point switching of controlled switches 51 and 52 than the monostable multivibrator 42 of FIG. 1.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

I claim:
1. A capacitance indicating device comprising:
   first and second terminal means adapted to respectively receive potentials of equal amplitude and opposite polarity;
   first and second controlled switch means each having an input connected to said first and second terminals, respectively and a common output;
   integrating analog to digital converter means having an input means and a readout recycling means for determining a readout cycle; and
   control means having an input and first and second outputs connected to said first and second controlled switch means, respectively, for selectively closing said first and second controlled switch means, said input of said control means connected to said integrating analog to digital converter recycling means for synchronizing said first and second controlled switch means with said readout cycle of said analog to digital converter means whereby said analog to digital converter means will yield a digital indication of the capacitance of a device applied between said controlled switch means output and said integrating analog to digital converter input.

2. The digital capacity meter of claim 1 wherein said control means includes means for switching said first and second controlled switch means substantially half-way through said readout cycle of said analog to digital converter means.

3. The capacitance indicating device recited in claim 1 including further integrating means connected between said controlled switch means and said device.

4. A digital capacity meter for yielding a digital indication of the capacitance of a component comprising:
   (a) means for applying signals of equal amplitude and opposite sense;
   (b) an integrating analog to digital converter having an input and a readout recycling means for determining a readout cycle; and
   (c) control means having first, second and third inputs and an output, said first and second inputs connected to said means for applying signals in order to receive said signals, said third input connected to said analog to digital converter recycling means for alternately coupling said means for applying signals to said control means output in synchonization with said readout cycle of said analog to digital converter;
   (d) whereby said analog to digital converter will yield a digital indication of capacitance of a component applied between said control means output and said analog to digital converter input.

5. The digital capacity meter of claim 4 and further including integrating means connected between the output of said control means and said component.

6. Apparatus for detecting a characteristic of an electrical component, comprising: first and second switch means, means for supplying signals of equal amplitude but opposite sense to said first and second switch means respectively, analog to digital converter means including means for integrating the signal supplied thereto and readout recycling means, and control means connected to said first and second switch means and to said recycling means such that said switch means are selectively rendered conductive in response to a signal from said recycling means whereby said analog to digital converter will yield a digital indication of a characteristic of an electrical component applied between said switch means and said analog to digital converter means.

7. The apparatus recited in claim 6 including inverting means connected between said recycling means and one of said first and second switch means whereby said switch means are rendered conductive in response to different level signals.

8. The digital capacity meter of claim 6 wherein said control means includes means for switching said controlled switch substantially half-way through said readout cycle of said analog to digital converter.

References Cited
UNITED STATES PATENTS 2,696,566  12/1954  Lion et al. _____ 324—6 X

FOREIGN PATENTS 878,653  10/1961  Great Britain.

RUDOLPH V. ROLINEC, *Primary Examiner.*
WALTER L. CARLSON, *Examiner.*
E. E. KUBASIEWICZ, *Assistant Examiner.*